July 6, 1937.　　　C. A. BICKEL　　　2,086,153
APPARATUS FOR CONTROL OF MACHINE TOOLS
Filed Feb. 3, 1932　　　6 Sheets-Sheet 1
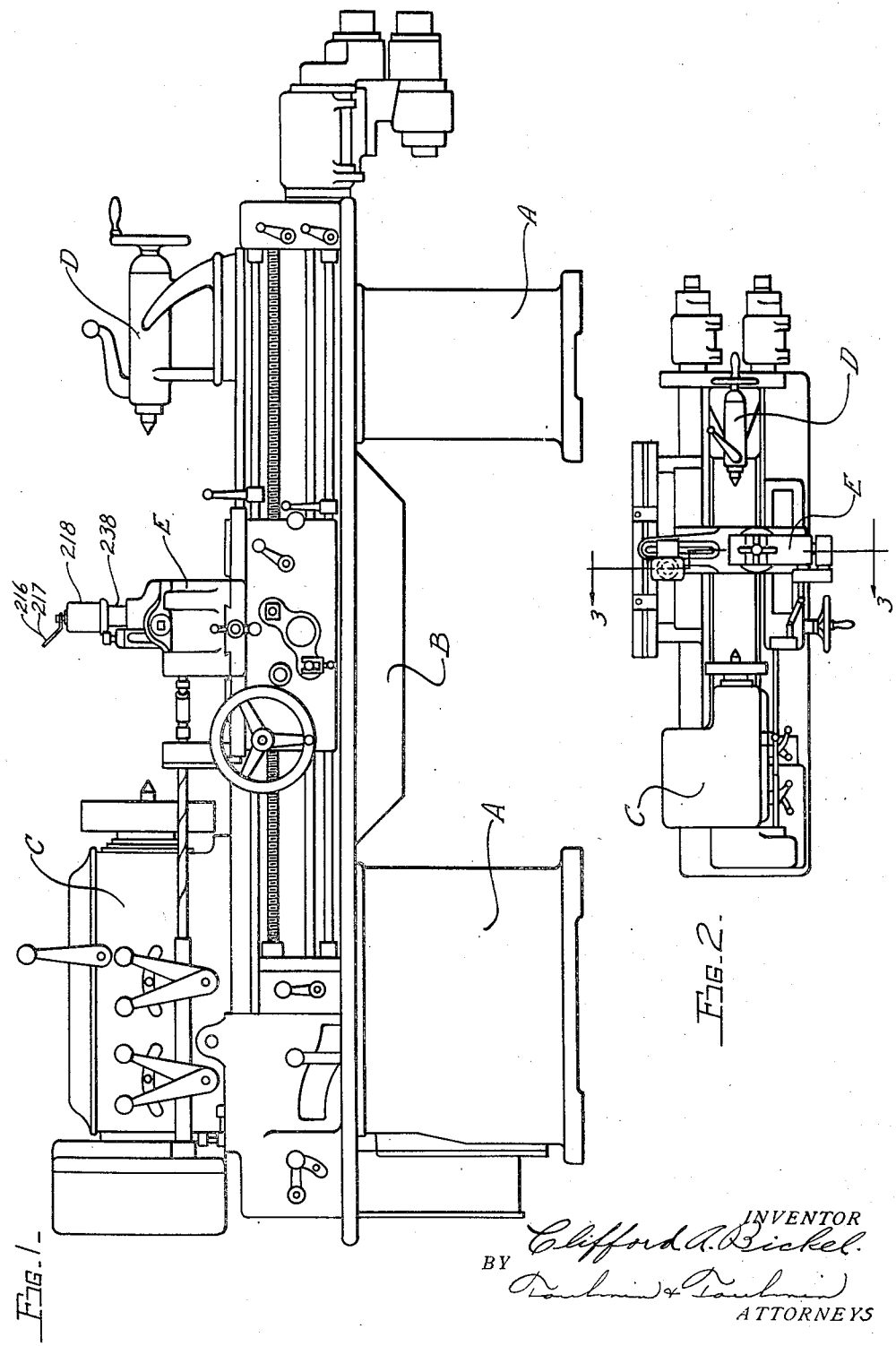

July 6, 1937.  C. A. BICKEL  2,086,153
APPARATUS FOR CONTROL OF MACHINE TOOLS
Filed Feb. 3, 1932   6 Sheets-Sheet 2
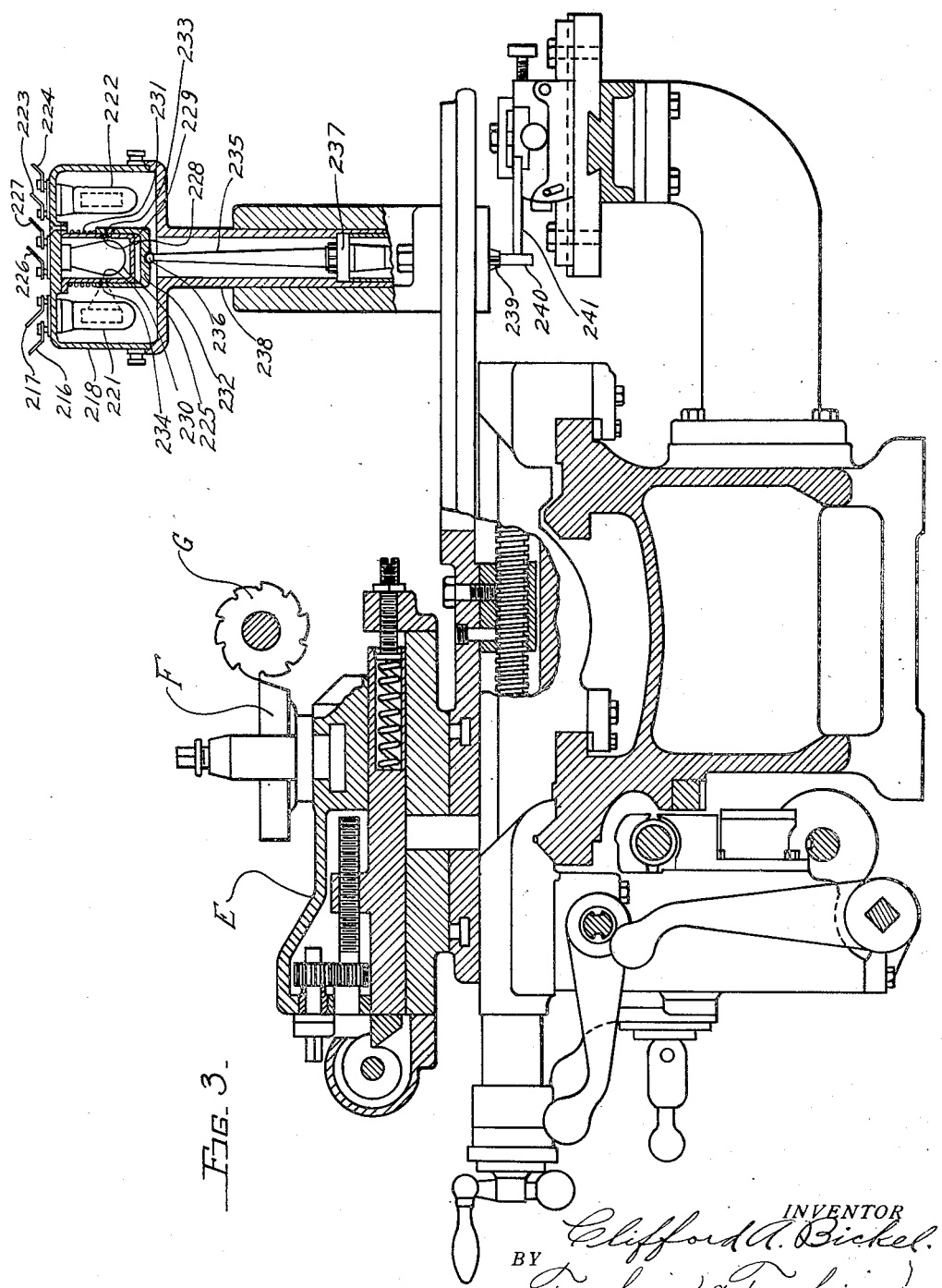
INVENTOR
Clifford A. Bickel.
BY
Toulmin & Toulmin
ATTORNEYS

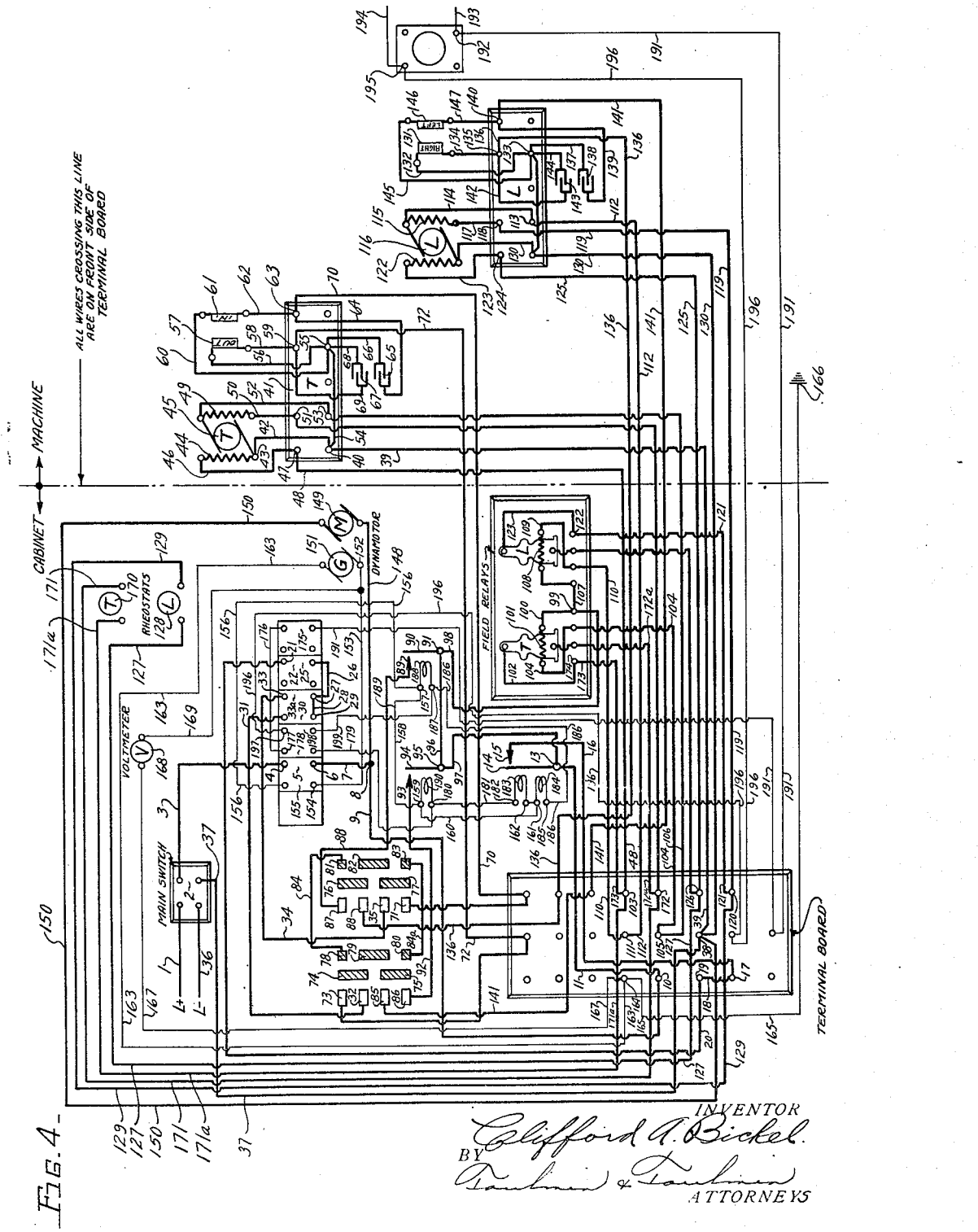

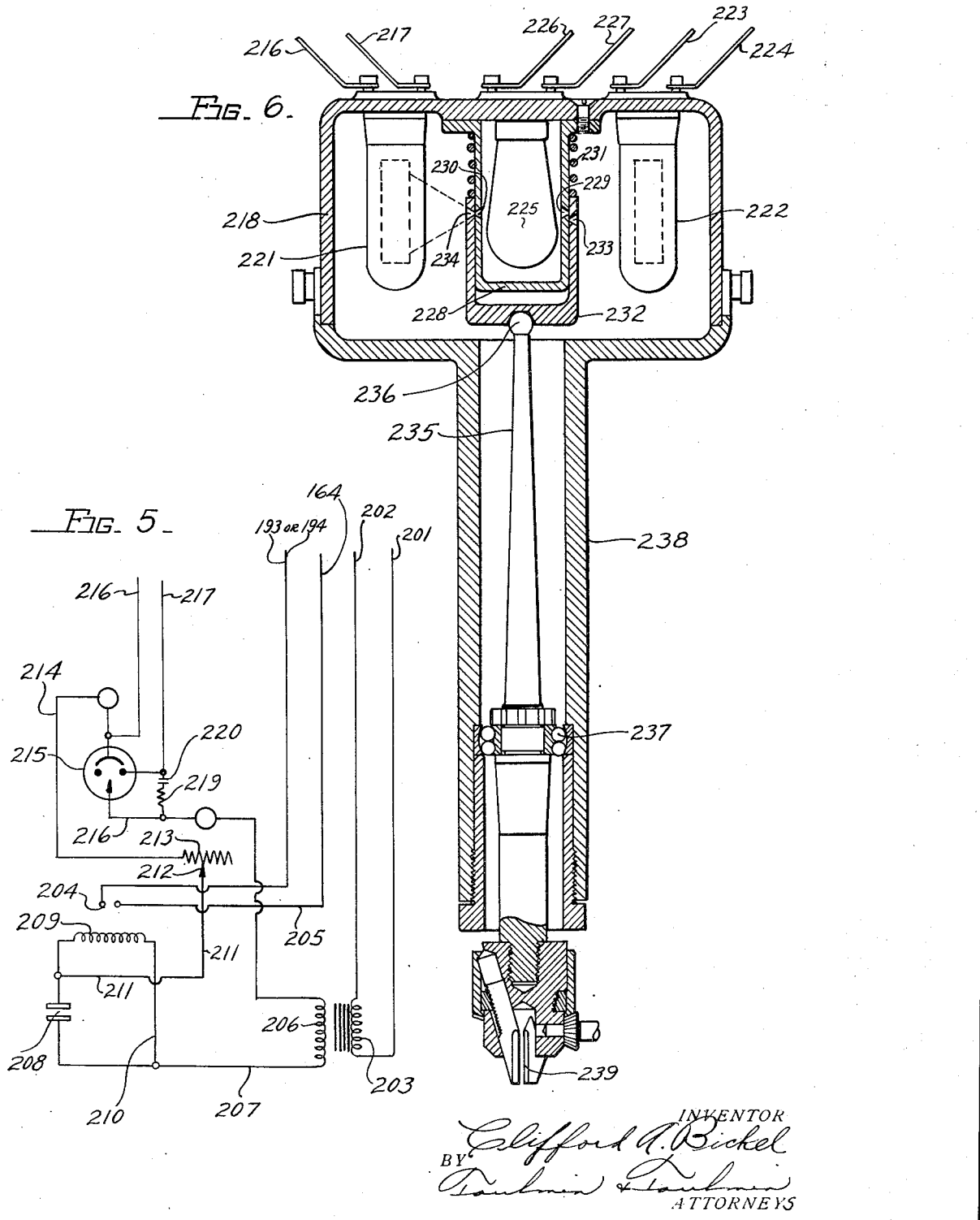

July 6, 1937.  C. A. BICKEL  2,086,153
APPARATUS FOR CONTROL OF MACHINE TOOLS
Filed Feb. 3, 1932  6 Sheets-Sheet 5
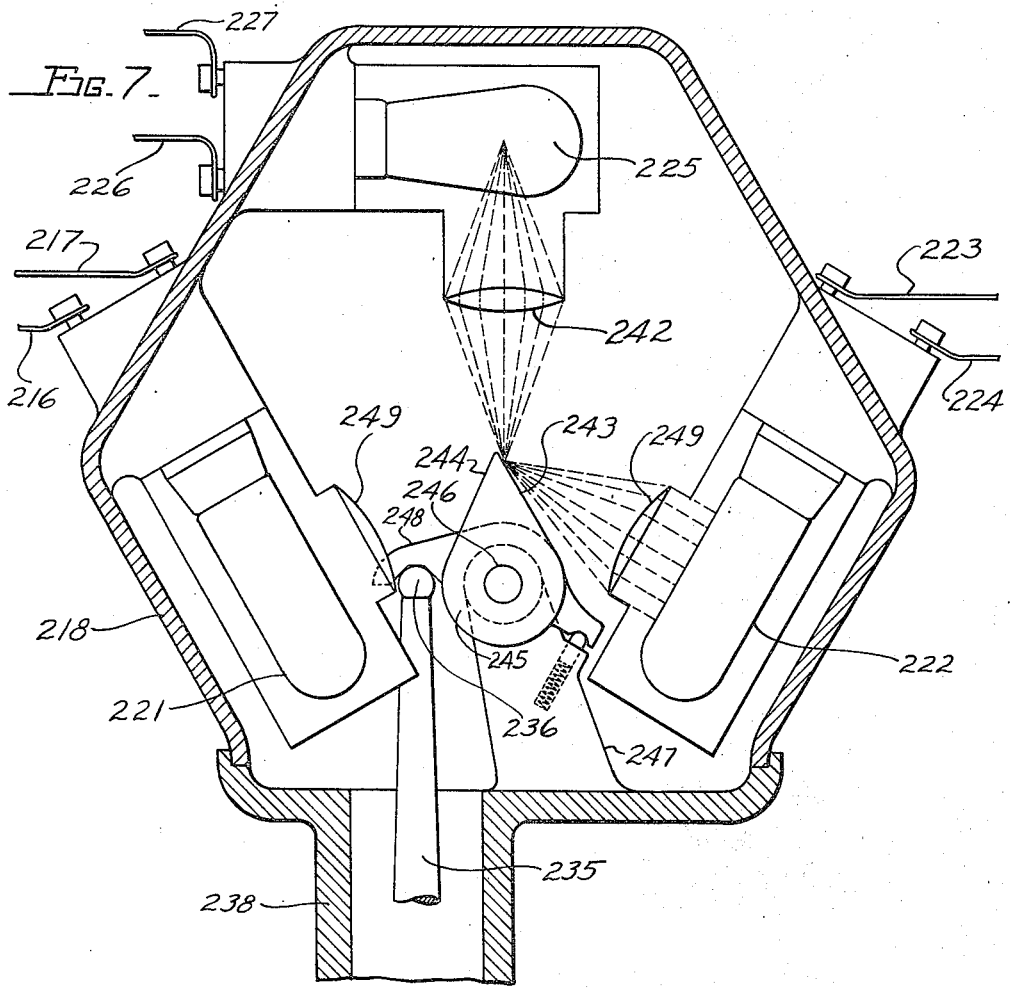
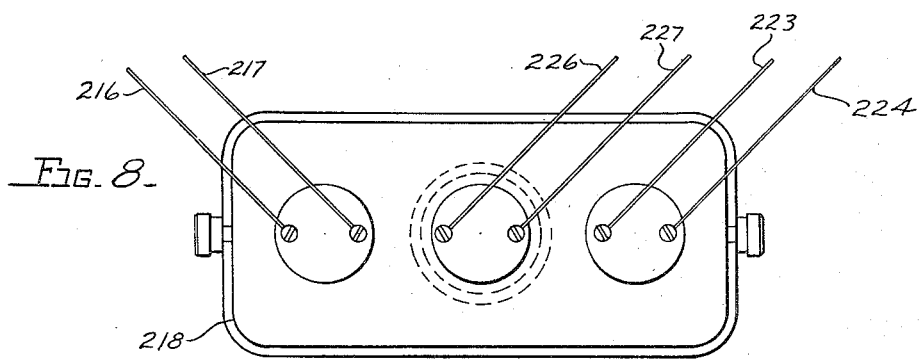
INVENTOR
Clifford A. Bickel
BY
ATTORNEYS July 6, 1937.  C. A. BICKEL  2,086,153
APPARATUS FOR CONTROL OF MACHINE TOOLS
Filed Feb. 5, 1932  6 Sheets-Sheet 6
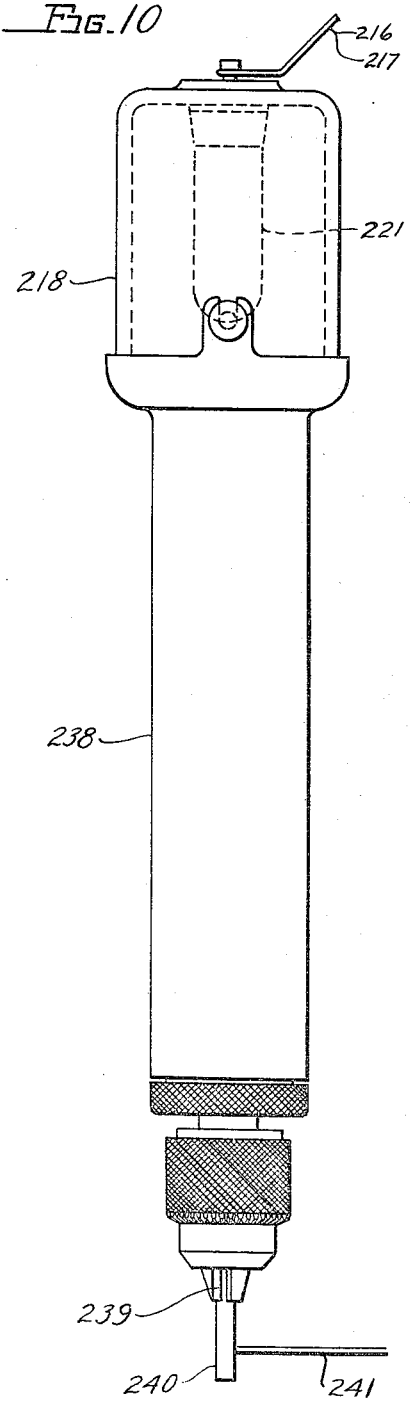
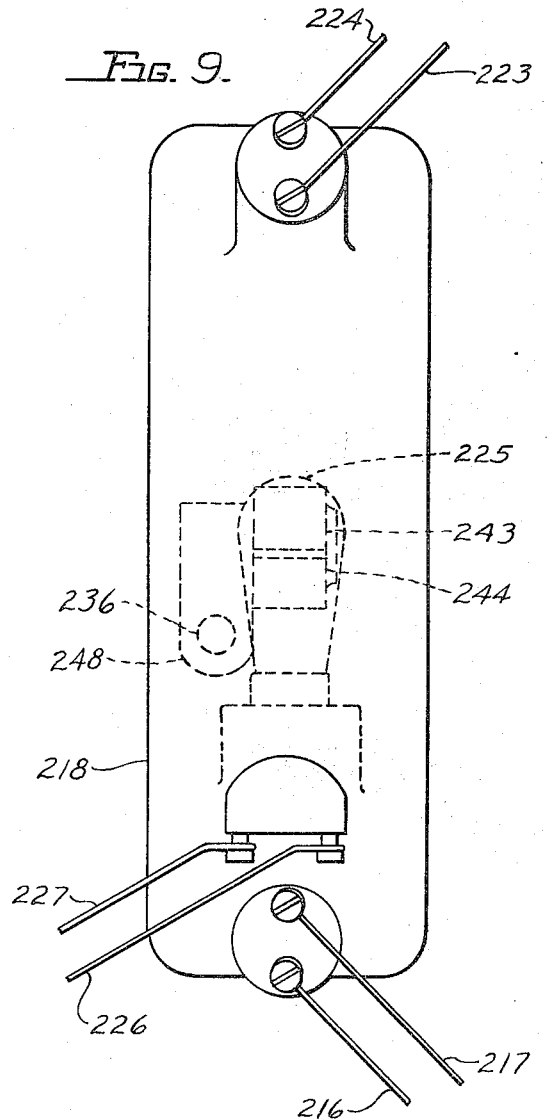

Patented July 6, 1937

2,086,153

UNITED STATES PATENT OFFICE 2,086,153

APPARATUS FOR CONTROL OF MACHINE TOOLS

Clifford A. Bickel, Sidney, Ohio, assignor to The Monarch Machine Tool Company, Sidney, Ohio, a corporation of Ohio Application February 3, 1932, Serial No. 590,666

20 Claims. (Cl. 82—14)

My invention relates to an electric apparatus and method and electric circuit for controlling machine tools, such as lathes, so as to cause the tool of the lathe to impart a given configuration to the work in accordance with the predetermined design which is used as the master controlling means for controlling the electric circuit that, in turn, controls the lathe.

It is my object to provide such circuit apparatus and practice a method in which I utilize apparatus of the same general character set forth in my copending application, Serial No. 583,570, filed December 28, 1931, in which there is a lathe having a motor for imparting longitudinal movement to the tool, a motor for imparting transverse movement to the tool and a system of magnetic clutches controlled by the electric circuit for alternately operating the motors to cause the tool supported on the carriage so moved by the motors to follow a predetermined configuration and to impart that configuration to the work.

As set forth in that application and as fully shown herein, I use a follower pin engaging with a template, but, in the present application, I have developed a novel system of control through the medium of light sensitive cells, thereby eliminating a switch mechanism and associated parts and making it possible to get an accuracy and responsiveness of control heretofore impossible with merely mechanical and electrical switches.

In particular, it is my object to provide a mechanism responsive to a template form which will so regulate the application of light to a series of light sensitive cells which are connected in circuit respectively to the respective actuating circuits for imparting different movements through the motors to the tool carrying mechanism so that, according to the light sensitive cell selected by the beam of light, I select the motor circuit and energize it which, in turn, imparts a given movement to the tool or a given tool, if a plurality of tools are employed, thereby making it possible with a single control mechanism to impart a variety of movements to a single tool or a variety of movements to a plurality of tools, or independent movements to independent tools.

Referring to the drawings:

Figure 1 is a side elevation of the lathe;
Figure 2 is a top plan view;
Figure 3 is a section on the line 3—3 of Figure 2;
Figure 4 is an electrical wiring diagram showing the electrical connections and associated mechanism for the practice of my invention;
Figure 5 is a detail wiring diagram of the specific photoelectric cell control;
Figure 6 is a vertical section through the follower pin, template and one form of mechanism for controlling the application of light beams to a series of light sensitive cells;
Figure 7 is a modification of Figure 6 showing the use of a mirror type of control;
Figure 8 is a top plan view of Figure 6;
Figure 9 is a top plan view of Figure 7;
Figure 10 is an end elevation of the tracer pin casing and template.

A indicates the legs of the tool having a pan B, a head stock C, a tail stock D, a carriage E, tool F and work piece G.

Referring to the left hand side of Figure 4, 1 indicates the positive side of a supply line which is connected to the main switch 2 on the outgoing side of which is the wire 3 which is connected to the positive terminal 4 of the main panel 5 which has a button switch connecting the terminal 4 with the terminal 6 of the line 7. This line 7 is connected at 8 to the line 9 which leads to the terminal 10 which, in turn, is connected by the wire 11 to the terminal 13 which carries a contact member 14 of a split relay having the contact member 15 which is connected by the wire 16 to the terminal 17. This terminal 17 in turn is connected by the wire 18 to the terminal 19 which is connected to the wire 20 that terminates in the terminal 21 of the switch board panel 22 which is connected by a switch 25 to the line 26, terminal 27, line 28 and terminal 29 through a switch 30 to the line 31 of the contact plate 32.

From the switch panel 22 there makes its exit from the terminal 33, which is connected by a switch 33a to the terminal 27 through a wire 34 through the contact plate 35. The switch panel 22 is called a directional switch panel. The negative side of the incoming circuit is connected to the main supply line wire 36 which, in turn, is connected to the switch 2 and makes its exit through the line 37 terminating at the terminal 38. A wire 39 leads from the terminal 38 to the terminal 40 to a terminal board 41. Connected to the terminal 40 is the wire 42 which terminates at 43 which is one end of a field 44 of the transverse motor 45, the other end of the field being connected by the wire 46 to the terminal 47 which is in turn connected to the wire 48. The other field of the motor 49 is connected on one side by the wire 50 to the terminal 51 on the board and on the other side by the wire 52 to the terminal 53 on the board. From the terminal 40 a wire 54 proceeds to the terminal 55 which in turn is connected by the wire 56 to one side of the magnetic clutch 57 which controls the "out" movement of the cross slide mounted on the carriage. The other side of this magnetic clutch is connected by the wire 58 to the terminal 59. The terminal 55 is connected by the wire 60 to the magnetic clutch 61 which is the clutch used for imparting the inward movement of the cross slide. The other side of this clutch is connected by the wire 62 to the terminal 63 on the board 41. The terminal 63 is connected by wire 64 into the condenser 65 which, in turn, is connected by the wire 66 to the terminal 55. The condenser 67 is connected to the wire 68 to the terminal 55 and on the other side to the wire 69 to the terminal 59.

The terminal 63 is connected by the wire 70 to contact plate 71. The terminal 59, which is connected by the "out" magnetic clutch, has a wire 72 which is connected to the contact plate 73.

A reversing contact drum is provided which has the moving contact members 74, 75, 76, and 77. It also is provided with the contact members 78, 79, 80, 81, 82, and 83. 78 and 81 are connected by the wire 84. 80 and 83 are connected by the wire 84a. By rotation of a drum carrying these movable contacts, the contact members 32, 73, 85, and 86 may be put in circuit, and the contact members 87, 88, 35, and 71 are also put in circuit. Contact member 87 is connected to the wire 88 contactor 76 to one side of the single relay 89 having the relay member 90 connected to the terminal 91. Likewise, a contact member 86 is connected by the line 92 to the single relay 93 having the movable member 94 connected to the terminal 95. The terminals 91 and 95 are connected to the wires 96.

The function of this drum switch mechanism is for a conversion of the circuits from primary longitudinal to primary transverse, or vice versa, that is, if the work is going to be mainly longitudinal, then the contacts will be in the position as shown on the right hand, and, if it is mainly transverse, it will be the contacts shown in hatched lines on the left hand. The wire 97 connects the terminal 95 to the terminal 13. Likewise, the wire 98 connects the terminal 91 to the terminal 99 which in turn is connected through the wire 100 to the field relay 101. 101 is a field relay of the transverse motor 45.

One side of this field relay, marked 102, is connected to the terminal 103 and, in turn, to the wire 48. The out-going wire 104 is connected to the terminal 105 and thence through the wire 106 to the terminal 53. The terminal 99 is connected by the wire 107 to the field relay 108 of the longitudinal motor. This is connected by the wire 109 to the wire 110, the terminal 111, thence through the wire 112 to the terminal 113, wire 114, field 115 of the longitudinal motor 116, the other side of such field being connected to the wire 117, the terminal 118, wire 119 to terminal 120, thence by wire 121 to terminal 122, wire 123 and relay 108.

Returning to the longitudinal motor, the other field 122 is connected by the wire 123 to the terminal 124 and line 125 which terminates in terminal 126 which in turn is connected by a wire 127 to a longitudinal rheostat 128, the other side of which is connected to the wire 129 to the terminal 120 to the wire 119. The other side of the field 122 is connected by the wire 130 to terminal 38. The longitudinal motor magnetic clutches provide for right and left hand movement depending upon which one is energized. Accordingly, 131 indicates the right hand magnetic clutch which is connected on one side by the wire 132 to the terminal 133. On the other hand, it is connected by the wire 134 to the terminal 135. A wire 136 is connected to the contact plate 88. The terminal 133 is connected by the wire 137, a condenser 138 which in turn is connected by the wire 139 to the terminal 140. The terminal 140 is connected by the wire 141 to the contact plate 85. The wire 142 leads from the terminal 135 to the condenser 143, the other side of which is connected to the wire 144 to the terminal 133. The wire 145 leads from the terminal 133 to the left hand magnetic clutch 146 that is connected by the wire 147 on its other side to the terminal 140. The wire 148 feeds the opposite side of the dynamotor 149, the negative side of which is connected by the wire 150 to the L-post 38. This provides the circuit for the motor side of the dynamotor, or the 110-volt circuit that is converted through the dynamotor to 14 volts. The generator side of the dynamotor is connected at 151. Its positive side at 152 is connected to the wire 153 which terminates at 154 where a switch 155 connects to the line 156 that terminates in the terminal 157 and is thence connected by the wire 158 to terminal 159 to wire 160 to terminal 161 which has a supplementary terminal post 162.

The negative side of the generator is 163 which is connected to 164 thence by wire 165 to the ground 166. The terminal 164 is connected by wire 167 to volt meter 168 which in turn is connected by the wire 169 to the line 153. The transverse motor rheostat 170 is connected on one side by a wire 171 to terminal 172 which in turn is connected by wire 172a to relay 101. The other side is connected by wire 171a to terminal 103 and thence by wire 173 to terminal 174 that in turn is connected by the wire 102 of the field relay 101.

The tracer switch 175 connects the line 176 to terminal 177 which is connected by a switch 178 to line 179 which is connected to terminal 180 which in turn is connected to wire 181 terminating in 182. 183 is the relay coil which connects terminals 182 and 162. 184 is the coil which connects the terminals 161 and 185. The line 186 connected to the terminal 185 leads to the terminal 187. 187 is connected to 157 through the coil 188 which is the relay coil. The terminal 157 is connected by the wire 156 to the switch 155. The terminal 157 is connected by the wire 189 to the terminal 159 to the relay coil 190 to terminal 180. The terminal 180 is connected to the wire 179 and to the wire 181.

The switch 175 connects the line 176 to the line 191 which in turn runs to the terminal 192 into which is connected the wire 193. The wire 194 is connected to the terminal 195 to wire 196 and terminates at 197 on the switch panel and is connected by a switch 198 to a wire 199 that terminates at 187. From thence wire 186 proceeds to terminal 185.

Lines 1 and 36 are being supplied with 110-volt D. C. current. Lines 201 and 202 are supplied with 110-volt A. C. current (Figure 5). In this circuit is connected the primary of a transformer 203. The line 193 or 194 is connected to a sensitive relay 204, the other side of which is connected to the line 205 which in turn is connected into the main system at 164.

The secondary of the transformer 206 is connected on one side by the wire 207 to the condenser 208 and thence to the coil 209 of the sensitive relay 204 back by the wire 210 to the wire 207. Between the condenser 208 and coil 209 is connected the wire 211 to the movable contact member 212 of the variable resistance 213 which is connected by the wire 214 to the grid glow tube 215, the other side of which is connected by the line 216 to the transformer winding 206.

Connected across the grid glow tube by the wires 216 and 217 is the control instrument generally designated 218 (Figures 6 to 10). 219 and 220 indicate a resistance and condenser for the grid glow tube.

To the wires 216 and 217 are connected a light sensitive photoelectric tube 221. Another tube 222 may be connected through wires 223 and 224 to mechanism similar to that described in Figure 6 which is connected by the wire 194 to the wire 196. The photoelectric cell 221 and its associated circuit controls transverse tool movement. Photoelectric cell 222 controls longitudinal movement. Between these cells is a light source 225 supplied with current from the wires 226 and 227. The light source is encased in a casing 228 having apertures 229 and 230 which are about 5/1000ths in the clear. Around this casing 228 is a helical spring 231 which engages with a reciprocating shutter 232 that slides over the surface of the enclosure 228 and has corresponding apertures 233 and 234. This shutter is moved by the rocking follower pin 235, the head of which 236 supports the shutter 232.

The rocking pin is supported for its rocking movement on the ball bearings 237 carried in the depending sleeve 238 of the housing 218.

The lower end of the pin carries a chuck 239, for carrying a tracer pin 240 which rides against the side of the template 241. An alternative construction is seen in Figure 7 where the light source 225 passes through a lens 242 so that the light beam is converged into a point upon either of the mirror surfaces 243 or 244. Such surfaces are supported upon the block 245 which is pivoted at 246 upon the arm 247. The pivotal support 246 in turn has an arm 248 which engages with and is actuated by the head 236 of the pin 235. The light impinging upon the mirror is reflected through the lens 249 on to the photoelectric tube 221 or 222.

*Method of operation*

The method of operation is as follows: A template of a form to which it is desired to cut the work is provided as at 241. The work is positioned in the machine and is rotated in the usual manner. The tool is brought into working position and simultaneously the follower pin 240 comes in contact with the template.

When this occurs, the electric circuit has been closed by having already plugged in wire 193 into the circuit and relay 204 being closed having been energized and the circuit having been actuated through the light source passing its light through the apertures 230 and 234 to the cell 221 which in turn completes the circuit and causes the "in" relay coil 190 to close the relay switch member 94 closing relay 190. This allows current to pass through 93 and 94, contact 86—80, wire 84, contact 83—71, wire 70, terminal 63 to "in" magnet 61, relay 183 and 188 being open, and thereby energize the magnetic clutch 61 which connects the transverse motor 45 to the carriage of the tool and proceeds to move the tool transversely of the work into the work as the work rotates in order to give the proper depth of cut. This continues until the tracer pin 240 comes in contact with the template 241 to thereby move the shutter 232 to cut off the light from the cell 221. This closing off of the light permits the relay 190 to open and serves to close the relay 14 with 15 so that the current moved through 16, 17, 18, terminal 19, 20, 21, 26, 27, 28, 29, 31, 32, contactor 79 to 85 through wire 141 to the left magnetic clutch of the longitudinal motor causing longitudinal feeding to the left towards the head stock, relays 190 and 188 being open, which continues until the template serves to move the follower pin out of the longitudinal path it is then traveling in order to cause the transverse movement out or in. This would depend upon whether the template was cut away from the work or to the work.

Assuming that the template was extending towards the work and "out" movement of the tool was desired in order to form the same configuration on the work as on the template, then the follower pin will move the shutter 232 so as to permit light to pass through the openings 229 and 233 to actuate the photoelectric cell 222 which in turn would result in closing the circuit to the transverse "out" magnetic clutch 57 so that the motor 45 could move the tool out. This is done by line 194, 196, 197, 198, 199, and 187 and relay coil 188, actuating relay member 90 to close it with 89 and also open actuating relay members 14 and 15 which allows the positive current to proceed through 97, 95, 96, 91, 90, 89, 88 to 87 thence by the cross over 81 to 78 and from 73 through the wires 72, 59, and 58 and clutch 57 which energizes the "out" magnetic clutch. If it is desired to re-trace the path just indicated in the reverse direction, the directional switch is actuated so as to close the line between 33 and 27.

The combination consists essentially of a longitudinal motor with a magnetic clutch for driving the parts alternately right and left, a transverse motor driving the parts alternately with clutches in and out, a template and a follower pin, the follower pin controlling three conditions:

(1) The application of a light source to energize a cell which will in turn actuate a circuit of the transverse motor for either in or out movement;

(2) Actuate a light source which controls the longitudinal motor for operating either right or left as the circuit may be set;

(3) And a neutral position where no light is issuing which permits the longitudinal motor to travel either right or left as it may be set.

For instance, photoelectric cell 221 will control the transverse "in" movement if the circuit is set for transverse "in" movement by the closing of switch 30 connected to 29 and 31, or it will control transverse movement "out" if the switch closes 27 and 33. Either one of them will be in and the other out as to the switches. Then it will feed to the right constantly as energized.

Photoelectric cell 222, if 221 is set to control "in" movement, will control "out" movement, or, if 221 is set for "out" movement, then 222 will control "in" movement.

Longitudinal movement is controlled either to the right or to the left according to the switch setting when the light source is darkened and is not acting upon the photoelectric cells and the transverse longitudinal motor 116 is functioning to move the carriage either to the right or to the left depending upon the switch setting. For instance, movement to the left by the longitudinal motor 116 is effected by actuating the left magnetic clutch 146 through closing the switch 30 connecting 29 and 31 and the longitudinal motor will move the carriage to the right through the actuation of the magnetic clutch 131 when the switches 33 and 27 are closed.

It will be understood that I desire to comprehend within my invention such modifications as may be necessary to adapt it to varying conditions and uses.

Having thus fully described my invention, what I claim as new and desire to secure by Letters Patent, is:

1. In an apparatus for controlling the movement of a tool, a motor for imparting transverse movement to the tool, a motor for transmitting longitudinal movement to the tool, a magnetic clutch for the longitudinal motor, two magnetic clutches for the transverse motor; a template, a follower pin; a light source, photo-electric tubes for controlling the transverse motor and the two magnetic clutches associated therewith for imparting in and out transverse movement, a shutter operated by said template and follower pin controlling said light source as it is applied to said tubes; and an electric circuit including said magnetic clutches and tubes.

2. In an apparatus for controlling the movement of a tool, transverse and longitudinal motors for the tool, each having a pair of magnetic clutches alternately operated; a template, a follower pin, a light source; photo-electric tubes, one for each group of motor and magnetic clutches; a shutter operated by said follower pin and template; and circuits for said respective groups of tubes, clutches and motors.

3. In an apparatus for controlling the movements of a tool for cutting a work piece, a longitudinal motor adapted to move a tool longitudinally of the work piece, a transverse motor adapted to move the tool to and from the work piece, and means for controlling the inward and outward movement of the tool by the motor comprising an electric circuit for controlling the in movement of the tool by the motor and an electric circuit for controlling the out movement of the tool by the motor, said circuits having light sensitive means therein, a light source, and means to control the application of said light source according to the form desired to be imparted to the work piece for admitting light from the light source to the light sensitive means in the respective circuits to alternately energize them.

4. In a machine for imparting a predetermined form to a work piece comprising a tool and a lathe supporting and rotating the work piece, a template of the form desired to be reproduced in the work piece, a follower pin, an electric motor for moving the tool relative to the work while the work rotates, an electric motor for moving the tool to and from the work, electric circuits adapted to alternately connect the motor to the tool to drive it to or from the work, light sensitive means in said circuits, a light source and means controlled by the follower pin for alternately admitting light from the light source to the light sensitive means according to the movement of the follower pin in engagement with the template.

5. In a machine for imparting a predetermined form to a work piece comprising a tool and a lathe supporting and rotating the work piece, a template of the form desired to be reproduced in the work piece, a follower pin, an electric motor for moving the tool relative to the work while the work rotates, an electric motor for moving the tool to and from the work, electric circuits adapted to alternately connect the motor to the tool to drive it to or from the work, light sensitive means in said circuits, a light source and means controlled by the follower pin for alternately admitting light from the light source to the light sensitive means according to the movement of the follower pin in engagement with the template, said follower pin having means to screen said light source entirely when the tool is being moved normally longitudinally of the work and no in and out movement is being imparted to the tool.

6. In a machine for turning a work piece comprising a tool adapted to be moved to and from a work piece and longitudinally of the work piece while the work piece is turning, a control means for moving said tool comprising a motor to drive it longitudinally of the work, a motor to move it to and from the work, electrically operated clutch means for alternately connecting the motor giving transverse movement to the tool or moving the tool to and from the work, and electric circuits in combination with said motor and clutch means, light sensitive means in said circuits for in and out movement of the tool, a light source, and means for controlling the operation of said circuits whereby the light source is covered when the longitudinal motor is moving the tool longitudinally of the work, and when the longitudinal motor is stopped the light source may be exposed to either of the light sensitive means in either circuit in the transverse motor whereby the tool may be moved either to the work or from the work, depending upon the circuit so energized by the light source.

7. In combination in a means of controlling the application of a tool to a work piece in a machine tool, means for normally operating the tool by moving it longitudinally of the work, means for moving the tool to and from the work, means including a motor and an electric circuit to move the tool inwardly or outwardly with relation to the work, means for admitting light for energizing electric circuits to cause said tool to move either inwardly or outwardly from the work, such means for admitting light being controlled according to the in and out configuration of the work to be produced.

8. In combination in a means of controlling the application of a tool to a work piece in a machine tool, means for normally operating the tool by moving it longitudinally of the work, means for moving the tool to and from the work, means for admitting light for energizing electric circuits to cause said tool to move either inwardly or outwardly from the work, such means for admitting light being controlled according to the in and out configuration of the work to be produced, and a circuit controlling the means for moving the tool longitudinally of the work adapted to render the means inoperative when the means for moving the tool in and out from the work is operative.

9. In combination, a circuit including a motor for moving a tool longitudinally of a work piece, a second circuit controlling the motor to move a tool from a work piece, a third circuit for controlling the last mentioned motor for moving the tool to the work piece, a template in the form in which it is desired to cut the work piece by the tool, a light sensitive means in the respective second and third circuits, a light source and means controlled by the form of the template as the tool moves relative to the work piece to control said light source whereby when the light source is concealed, the first circuit is operative and the tool moves longitudinally, and when the light source is exposed to either of the light sensitive means in the second and third circuits, the first mentioned circuit is inoperative and the tool either moves inwardly or outwardly to and from the work according to the circuit so energized.

10. In combination, in a machine tool adapted to rotate a work piece and having a tool for engaging with the work piece to impart a configuration to it, of a motor adapted to move the tool longitudinally and a pair of magnetic clutches alternately engageable in circuit with the motor for determining the direction of longitudinal movement, a motor adapted to move the tool transversely having a circuit with two magnetic clutches adapted to be alternately engaged for determining the direction of in and out movement of the tool, light sensitive means in the last mentioned circuit adapted to alternately control the respective magnetic clutches, a light source, a shutter adapted to conceal the light source or admit light therefrom to either of the said light sensitive means, a template and a follower pin adapted to operate said shutter according to the movements of the pin imparted to it by the template.

11. In a mechanism for controlling an apparatus according to the form of a template, a template, a follower pin, a shutter moved according to the configurations of the template, a light source concealed by said shutter and having means in the shutter for permitting the exit of light from said light source, and light sensitive cells associated therewith having circuits energized according to the position of the shutter.

12. In combination, in a mechanism for controlling an apparatus according to the form of a template, a template, a rocking follower pin, a shutter mounted therein and reciprocated thereby having apertures therein, an enclosure for registering apertures therein, a light source in said enclosure and light sensitive cells arranged so that when the shutter openings register with the enclosure openings in their respective groups, the associated cells will receive light from said light source, said shutter being adapted to completely cut off the light from making its exit from the enclosure.

13. In combination, in a mechanism for controlling an apparatus according to the form of a template, a template, a follower pin, a light source, a mirror operated by said follower pin and light sensitive means adapted to be alternately energized by the direction through the mirror of light from the light source thereto.

14. In combination, in a mechanism for controlling an apparatus according to the form of a template, a template, a follower pin, a light source, a mirror operated by said follower pin and light sensitive means adapted to be alternately energized by the direction through the mirror of light from the light source thereto, and lens means for amplifying and directing the light to and from the mirror.

15. In combination, in a mechanism for controlling an apparatus according to the form of a template, a template, a follower pin rocked thereby, a pair of mirror surfaces rocked by said follower pin adapted to alternately direct a light beam, spaced photo-electric tubes adapted to receive a light beam from the respective mirror faces and a light source for said mirror.

16. In combination, in a mechanism for controlling an apparatus according to the form of a template, a template, a follower pin rocked thereby, a pair of mirror surfaces rocked by said follower pin adapted to alternately direct a light beam, spaced photo-electric tubes adapted to receive a light beam from the respective mirror faces and a light source for said mirror, and means for enclosing said light source to direct it toward the mirrors and means for enclosing the light sensitive means for collecting the light beam only when directed to it by its mirror.

17. In combination, in a mechanism for controlling an apparatus according to the form of a template, a template, a follower pin rocked thereby, a pair of mirror surfaces rocked by said follower pin adapted to alternately direct a light beam, spaced photo-electric tubes adapted to receive a light beam from the respective mirror faces and a light source for said mirror, and means for enclosing said light source to direct it toward the mirrors and means for enclosing the light sensitive means for collecting the light beam only when directed to it by its mirror, and lens means associated with said light source and said respective light sensitive means.

18. In combination, in a mechanism for controlling an apparatus according to the form of a template, a plurality of spaced depending photo-electric tubes and an intermediate light source depending therebetween, an enclosure having apertures for admitting light to each photo-electric tube from said light source, a shutter having registering enclosures adapted to cut off said light source, and means actuated according to a predetermined form for regulating the application of said light source to energize the respective photo-electric tubes.

19. In combination in a circuit for the purpose of controlling the application of a tool to a workpiece, a high voltage circuit, a transformer therein, a low voltage circuit associated therewith, a grid glow tube in said voltage circuit, a light-sensitive tube in said low voltage circuit, a light source for directly energizing said light-sensitive tube, and power-operated means controlled by said circuit including said light-sensitive tube adapted to be operated when said tube is energized by said light source.

20. In combination in a circuit for the purpose of controlling the application of a tool to a workpiece, a high voltage circuit, a transformer therein, a low voltage circuit associated therewith, a grid glow tube in said low voltage circuit, a light-sensitive tube in said low voltage circuit, a light source for directly energizing said light-sensitive tube, and power-operated means controlled by said circuit including said light-sensitive tube adapted to be operated when said tube is energized by said light source, said grid glow tube circuit including a sensitive relay, an adjustable resistor and a condenser.

CLIFFORD A. BICKEL.